United States Patent [19]
Van Oorschot

[11] Patent Number: 6,134,327
[45] Date of Patent: Oct. 17, 2000

[54] METHOD AND APPARATUS FOR CREATING COMMUNITIES OF TRUST IN A SECURE COMMUNICATION SYSTEM

[75] Inventor: Paul C. Van Oorschot, Ottawa, Canada

[73] Assignee: Entrust Technologies Ltd., Ottawa, Canada

[21] Appl. No.: 08/957,612

[22] Filed: Oct. 24, 1997

[51] Int. Cl.[7] .................................. H04L 9/30; H04L 9/00
[52] U.S. Cl. ........................................ 380/30; 340/825.04
[58] Field of Search ................................ 380/49, 21, 45, 380/30; 340/825.31

[56] References Cited

U.S. PATENT DOCUMENTS

| | | | |
|---|---|---|---|
| 5,664,017 | 9/1997 | Gressel et al. | 380/30 |
| 5,666,416 | 9/1997 | Micall | 380/23 |
| 5,717,758 | 2/1998 | Micall | 380/25 |

*Primary Examiner*—Tod R. Swann
*Assistant Examiner*—Todd Jack
*Attorney, Agent, or Firm*—Markison & Reckamp, P.C.

[57] ABSTRACT

A method and apparatus for creating communities of trust within a secure communications system is accomplished by allowing end-users to obtain arbitrary lists of trusted public keys from other end-users and from associated authorities. Once an arbitrary list has been obtained by an end-user, the end-user determines whether it was obtained in a manner consistent with a security policy of the secured community. The security policy may enable an end-user to receive trusted public keys from other end-users, from associated authorities only, to receive public keys of associated authorities, other end users, or any combination thereof. When the arbitrary lists of trusted keys are obtained in a manner consistent with the security policy, the end-user adds keys of the arbitrary lists to a trusted key list. When a security-related operation is to be performed (e.g., verifying a signature of a received message or retrieving the encryption public key of a recipient for an outgoing message), any of the trusted keys contained within the trusted list may be used for authentication purposes.

16 Claims, 4 Drawing Sheets

METHOD AND APPARATUS FOR CREATING COMMUNITIES OF TRUST IN A SECURE COMMUNICATION SYSTEM

TECHNICAL FIELD OF THE INVENTION

The present invention relates generally to encryption and more particularly to public key management within a secured communication system.

BACKGROUND OF THE INVENTION

As is known, to securely transmit data from one party to another in a secure communication system, the transmitted data is encrypted using an encryption key and an encryption algorithm. Such an encryption algorithm may be a symmetric key algorithm such as the data encryption standard ("DES") and the encryption key corresponds with the symmetric key. Such a secure transmission begins when a sending party encrypts the data using the symmetric key algorithm and the symmetric key. Once the data is encrypted, it is transmitted to the receiving party over a transmission medium (i.e., Internet, telephone line, local area network, wide area network, etc.). Upon receipt, the receiving party decrypts the data using the same symmetric key, which must be transmitted to it or derived by it using a secure mechanism.

Encrypting data using a public key algorithm is somewhat more expensive than using a symmetric key algorithm but it is easier to convey the encryption key to the receiving party using the public key algorithm than using the symmetric key algorithm. Thus, to obtain the cost saving benefits of symmetric key encryption and the key distribution advantages of public/private key pairs, a wrapped session key is provided to the receiving party along with the data that is encrypted using the symmetric key. The wrapped key is a symmetric key that has been encrypted using the encryption public key (of a public/private key pair) of the receiving party. When the receiving party receives the encrypted message, it decrypts the wrapped session key using its private key to recapture the symmetric key. Having recaptured the symmetric key, it utilizes it to decrypt the message. Typically, symmetric keys are used for a relatively short duration (e.g., a communication, a set number of communications, an hour, a day, a few days), while encryption public keys are used for a longer duration (e.g., a week, a month, a year or more).

To further enhance security of encrypted data transmissions in a secure communications system, the sending party provides its signature with encrypted messages that it transmits. The signature of the sending party consists of a tag computed as a function of both the data being signed and the signature private key of the sender. The receiving party, using the corresponding signature verification public key of the sending party, can validate the signature. To ensure that the receiving party is using an authentic signature verification public key of the sending party, a signature public key certificate is employed. The signature public key certificate includes the public key of the sending party and the signature of a certification authority. The receiving party first verifies the signature of the certification authority using the trusted public key of the certification authority which signed the certificate.

The receiving party has acquired trust in this public key by some other means, for example by having been initialized to trust this key and storing this key locally in a trusted manner. Another method for acquiring trust in this public key is through the use of a certificate chain, as is well known in the art. In a certificate chain, the root, or anchor, of trust is a public key which the receiving party has obtained trust in a priori, for example at the time of initialization. Once the signature of the certification authority on the certificate of the sending party is verified, the receiving party can trust the signature public key of the sending party and use this key to verify the signature of the sending party on the message. Similarly, the encryption public key of an intended recipient, as discussed earlier, is typically obtained by the sending party from a public key certificate and its validity is analogously verified prior to its use, in this case for encryption.

While the above signature verification process suffices in many circumstances, an end-user determines the validity of another end-user's public key based on the trusted public key of a certification authority which it already possesses. In this manner, the user either trusts all of the end-users affiliated with the particular certification authority or none. As such, a user is not able to trust some, but not all, of the end-users affiliated with a different certification authority. In addition, in systems such as those described in copending application entitled METHOD AND APPARATUS FOR PUBLIC KEY MANAGEMENT, having an attorney docket number of ENT970710-2, and assigned to the same assignee as the present patent application, an end-user may only receive trusted public key certificates from its own certification authority or another designated certification authority. The end user, however, is not authorized to receive trusted public key certificates from other end-users.

In yet other prior art systems, such as PGP (Pretty Good Privacy) system and an Entrust/Client system, an end-user's software may be configured to trust the public key certificate of another individual end-user, but this is limited to acquiring trust in one end-user at a time, and trust cannot be conveniently acquired in lists of certificates corresponding to arbitrary subsets of end-users. In still other systems, such as in web browsers, the user's software includes a preconfigured list of trusted authority certificates. Such preconfiguring of lists limits security policy control, in that, a user may add or delete any certificates to the list that he or she desires. In addition, the preconfigured list only includes certificates of authorities.

To provide added flexibility and convenience in building communities of trust in secure communications systems, end-users need to be provided with the ability, when consistent with security policy, to obtain trust in the public keys of other users and other certification authorities through a combination of methods. In addition, end-users need to be provided the ability to obtain trust in the public keys of a subset of a certification authority's end-user community without necessarily having to trust the entire community. Furthermore, end-users need to be able to acquire such trust in subsets by a method more convenient than carrying out a separate configuration transaction for each end-user's key(s).

DETAILED DESCRIPTION OF A PREFERRED EMBODIMENT

Generally, the present invention provides a method and apparatus for creating communities of trust within a secure communications system. This is accomplished by allowing end-users (defined below) to acquire trust in an arbitrary list of public keys of an arbitrary collection of entities (end-users and/or certification authorities). Such trust may be obtained, for example, by: transport using a trusted channel such as a bonded courier; transport by a personal exchange between trusted individuals who are capable of recognizing each other; and/or transport over an unsecured medium, augmented by confirmation, over an authenticated channel, using a cryptographic checksum of the data exchanged over the unsecured medium.

The arbitrary lists of public keys may be obtained from other end-users and/or associated authorities (E.g., a policy authority, a certificate certification authority and/or a system administrator). Once the arbitrary list has been obtained, the end-user determines whether it was obtained in a manner consistent with a security policy of the secured community. The security policy may enable an end-user to receive trusted public keys from other end-users, from associated authorities, to receive public keys of other end-users, to receive public keys of associated authorities or any combination thereof. When the arbitrary lists of trusted end-user public keys are obtained in a manner consistent with the security policy, the end-user adds the public keys of the arbitrary lists to a trusted public key list. When a security-related operation is to be performed (e.g., verifying a signature of a received message or using the encryption public key of a recipient for an outgoing message), any of the trusted end-user public keys contained within the trusted list may be used without further validation. Any certification authority public keys within the trusted list may be used for validating public key certificates. With such a method and apparatus, a secure communications system provides greater convenience and flexibility in defining communities of trust. As such, an end-user may acquire collections of trusted public keys, which may be contained in trusted public key certificates, of other end-users that are affiliated with different associated authorities. The end-user may also acquire trusted public keys of associated authorities from other end-users when the end-user is authorized pursuant to the system security policy.

Figure 1:
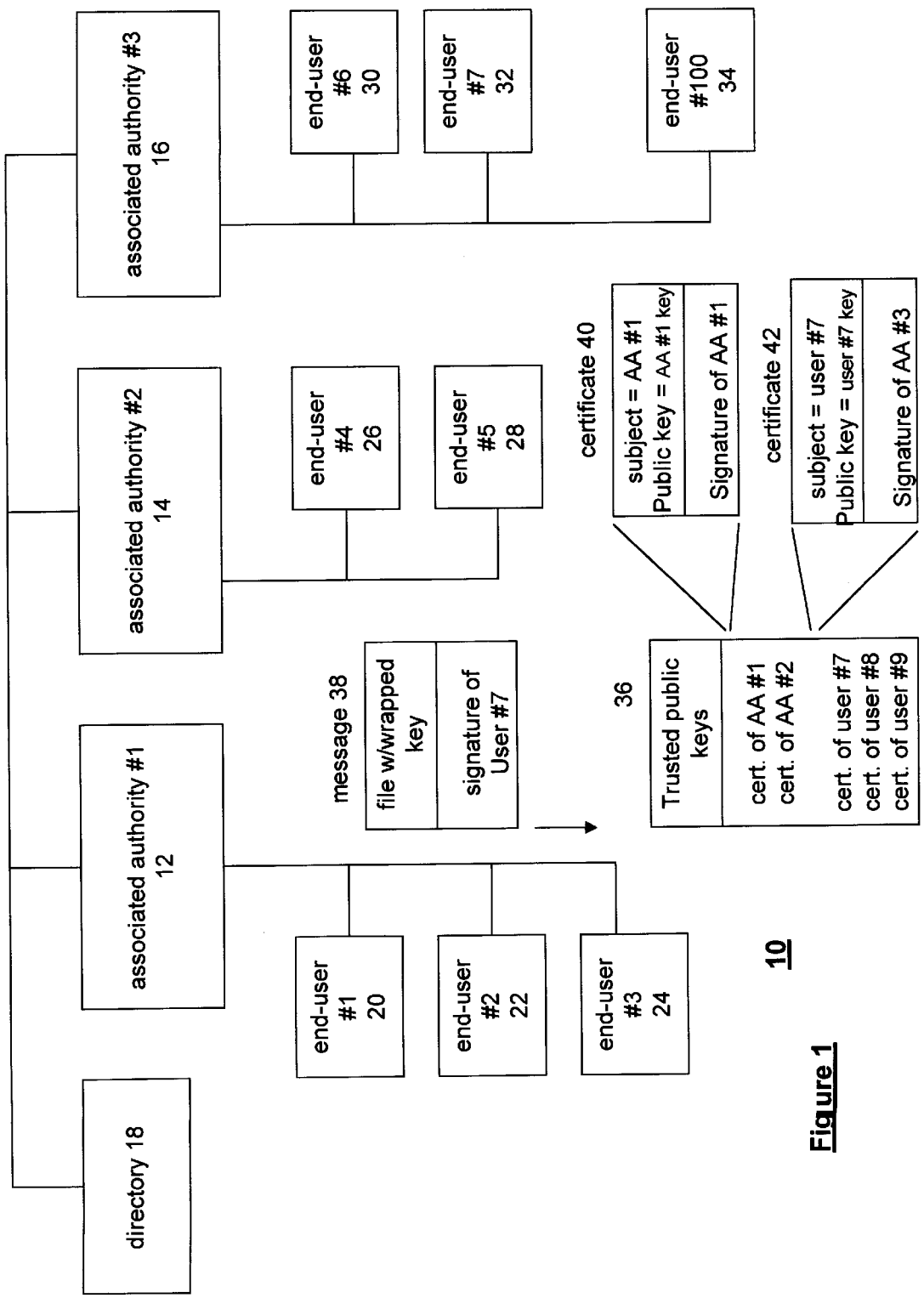
FIG. 1 illustrates a schematic block diagram of a secured communication system in accordance with the present invention.

FIG. 1 illustrates a schematic block diagram of a secured communications system 10 that includes a plurality of associated authorities 12–16, a directory 18, and a plurality of end-users 20–34. The associated authorities 12–16 may be personal computers equipped with a software program to function as a certification authority server, or security manager. Such software may be the Entrust/Manager software manufactured and distributed by Entrust Technologies, Ltd. that further includes the features described herein. The directory 18 is a database that stores public key information of the end-users in the secured communication system 10. The end-users 20–34 are personal computers equipped with appropriate software (for example client or end-user encryption software), or other computer communications equipment such as routers, gateways or firewall devices. Such end-user encryption software may be the Entrust/Client software manufactured and distributed by Entrust Technologies, Ltd. that further includes the features described herein. Note that an end-user may represent an individual and/or any logical entity in a computer communications network.

As shown, end-users no. 1, 2, and 3 are affiliated with associated authority 12, end-users no. 4 and 5 are affiliated with associated authority 14 and end-users no. 6–100 are affiliated with associated authority 16. Each of the end-users 20–34 stores the public key of its associated authority in a trusted public key list 36. The list contains a sufficient representation of a public key to allow a determination whether a candidate public key is on the list. (Note that the list 36 may contain public keys, public key certificates, hashed representations of public keys and/or public key certificates.) The list may contain additional information for each public key such as the corresponding owner entity. For example, the list contains public keys embedded in public key certificates. In other words, the list is a list of public key certificates. As an example, the list 36 for end-user 1 includes the public key certificate of associated authority no. 1. The public key certificate 40 of associated authority 1 includes a subject identifier, which identifies associated authority number 1, the public key of the associated authority number 1, and the signature of the associated authority, as well as other information as may be included in other certificates used in the system. Note that in this example public key certificate 40 is a self-signed certificate. In other words, the end-user's trust in the public key within this certificate is based on the secure manner in which this certificate was embedded in the software of end-user 1, rather than by verifying the signature on the certificate. In general, a certificate may either be self-signed or signed by another authority.

The trusted public key list 36 for end-user 1 further includes the public key certificate of associated authority no. 2 and the public key certificates of end-users 7, 8, and 9. End-user 1 may obtain the public key certificate of associated authority no. 2 in a variety of ways. For example, the public key certificate of associated authority no. 2 may have been obtained in the same manner as the public key certificate of associated authority no. 1 was obtained. In other words, associated authority no. 2 is a trusted authority of end-user no. 1. As another example, end user no. 1 may have obtained the public key certificate of associated authority no. 2 directly from associated authority no. 1, the authority with which it is affiliated. As yet another example, end-user no. 1 may have obtained the public key certificate of the associated authority no. 2 from a trusted end-user. Note that an end-user public key should be distinguished from an associated authority public key due do the difference in use. For example, associated authority public keys are used to verify the signatures on other certificates, while an end-user signature public key is used for security related operations other than verifying certificate signatures and when in trusted public key lists are also used as a base for a comparison, which is discussed below.

End-user no. 1 obtains the trusted public keys of end-users 7, 8 and 9, for example, as public key certificates from a trusted source. The trusted source may be another end-user affiliated with the same trusted associated authority (e.g., end-users no. 3 and no.2). Alternatively, the trusted source may be the end-user's associated authority (e.g., associated authority no. 1 for end-user no. 1). Regardless of the source of the trusted public keys of end-users no. 7, 8, and 9, end-user no. 1 stores these keys or their associated certificates 42 in its trusted public key list 36. As shown, each of the end-user public key certificates 42 includes a subject identifier, which identifies the particular end-user, the public key of the end-user, and a signature of an authorized entity. (Note that the authorized entity may be an associated authority or the end-user itself if the end-user certificate is self-signed, for example if that end-user is not affiliated with any other associated authority.) For example, for end-user 7, the subject reflects end-user 7, the public key is that of end-user 7 and the signature is of associated authority no. 3. Note that the trusted public key list 36 of end-user 3 does not include the public key certificate of associated authority #3, thus the authenticity of public key certificates signed by associated authority no. 3, and acquired by end-user 1 from a public directory 18 or other source, cannot be verified by checking the signature on the certificate using an a priori trusted associated authority public key, whereas those signed by associated authority no. 1 or no.2 can.

For example, assume that end-user no. 1 is receiving a message 38 from end-user no. 7, where the message 38 includes a file with a wrapped session key and the signature of end-user no. 7. Optionally, it may also include the (unverified) public key certificate of user no.7 as a guide to which public key should be used to verify the message signature, or a unique public key identifier (such as a serial number, or message digest or fingerprint of the public key certificate) or other identifier of the originating party no. 7. To validate the message 38, end-user no. 1 first attempts to verify the signature of end-user no. 7, which end-user no. 1 does by first obtaining a signature verification public key of end-user no. 7. This key may be obtained from an included certificate, or using other identifying information in message 38 to acquire the certificate from an untrusted source such as a directory 18. At this point, to establish the trustworthiness of this public key, end-user no. 1 attempts to verify the signature thereon of the associated authority #3, which signed the public key certificate of end-user 7. Because the list 36 of end-user no. 1 does not include, among the trusted associated authority public keys, the public key of associated authority #3, end-user no. 1 cannot directly authenticate the public key certificate of end-user 7 (i.e., end-user no. 1 cannot verify the signature as it would if it were signed by associated authority no. 1 or no. 2). To overcome this problem, end-user no. 1 compares the signature public key certificate of end-user no. 7 associated with the received message 38 with the public key certificate for user no. 7 found in its trusted list 36. If the certificates substantially match, end-user no. 1 can use the associated public key as a trusted public key to verify the validity of the signature on message 38, and if the signature verifies successfully then trust that the message 38 was originated by end-user 7. Note that in this comparison process, a substantial match occurs when there could be no confusion as to which public key certificate the certificate associated with the incoming message matches. For example, each bit of the incoming certificate must match each corresponding bit in the trusted certificate. As an alternate example, the cryptographic checksums (also known as message digests or fingerprints) of the two certificate representations must match.

Similarly, for example, when end-user no. 1(20) wishes to encrypt an outgoing message for end-user no. 8 whose encryption public key certificate is signed by an associated authority not among those trusted by end-user no. 1, end-user no. 1 finds an encryption public key certificate corresponding to user no. 8 in its trusted public key list, and then (without the need for a matching process as per the signature certificate case above) uses this public key directly as a trusted public key for preparing a wrapped session key for an outgoing encrypted message to user no. 8.

In the manner described by the above example, end-users may trust public key certificates of other end-users that are affiliated with different associated authorities without having to obtain a trusted public key of that associated authority. Moreover, this allows trust in a subset of the individuals in the community affiliated with that authority, without trusting the entire set of affiliated users. As presumed in the above example, end-user no. 1 only had an interest in communicating with user 7, 8 and 9 of the group of end-users affiliated with associated authority #3. With the present method and apparatus, end-user no. 1 was able to obtain the public key certificates of end-users no. 7, 8, and 9 (and was able to acquire these all in a single list via a single transaction, rather than one by one) without having to obtain the public key certificate of associated authority no. 3. Thus, the present method and apparatus provide the end-user with greater flexibility as to whom the user may communicate with in a secure manner. The use of trusted lists of certificates may be combined with the customary use of trusted certification authority public keys, which allow users to trust certificates by verifying the signatures on such certificates directly, or through the further processing of certificate chains. As one of average skill in the art will readily appreciate, the above example is applicable to other end-users in the system 10, and that other end-users may obtain public key certificates from other end-users and/or from associated authorities.

Figure 2:
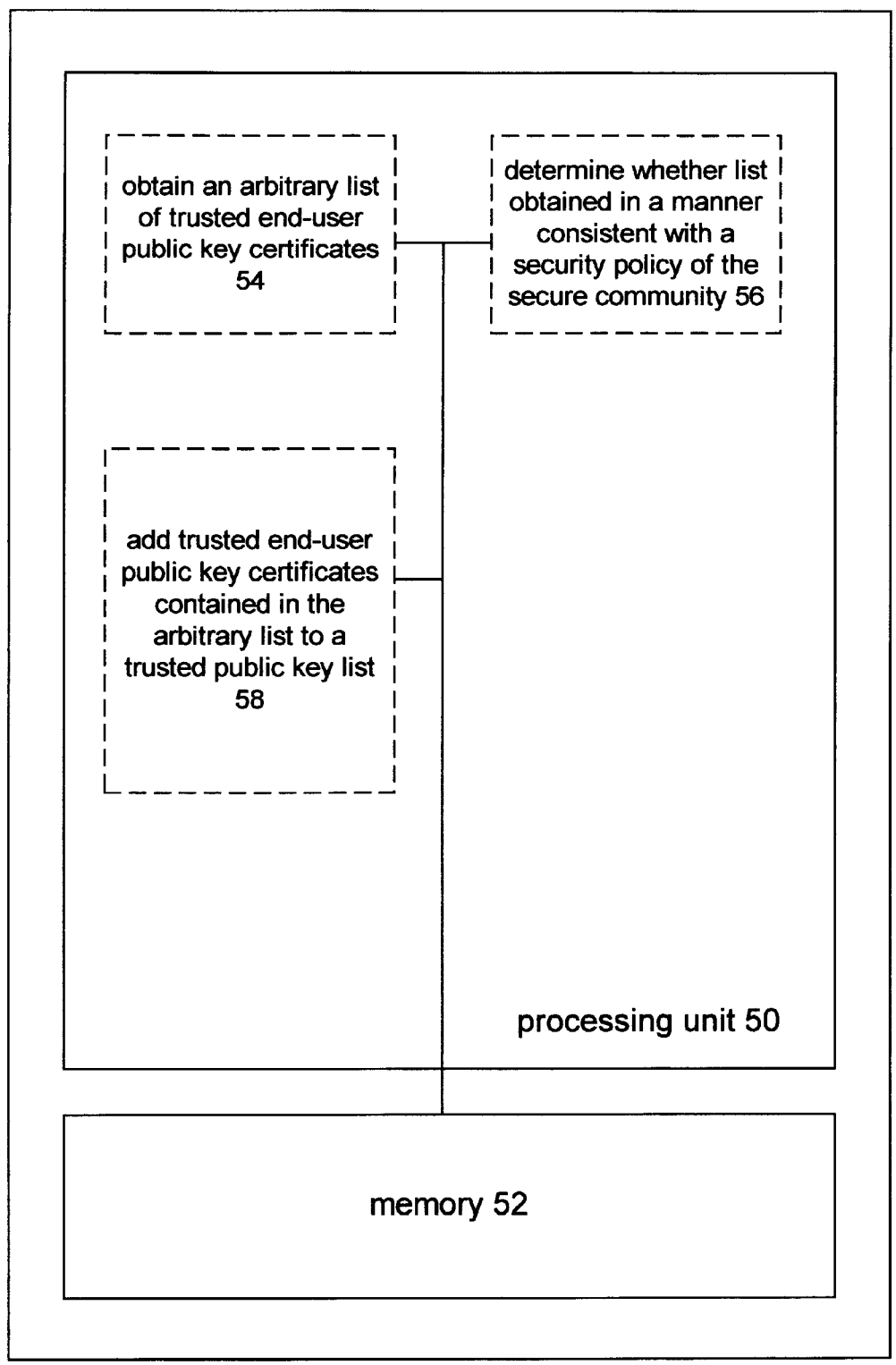
FIG. 2 illustrates a schematic block diagram of an end-user in accordance with the present invention.

FIG. 2 illustrates a schematic block diagram of an end-user computer 20–34, which includes a processing unit 50 and memory 52. Memory 52, which may be a read-only memory, random access memory, floppy disk, hard drive memory, magnetic tape memory, DVD memory, CD ROM memory, or any other device for storing digital information, stores programming instructions. The processing unit 50, which may be a microprocessor, microcontroller, digital signal processor, central processing unit, or any other device that manipulates digital information based on programming instructions, executes the programming instructions stored in memory 52 to function as a plurality of circuits to create communities of trust.

While executing the programming instructions stored in memory 52, the processing unit 50 functions as a circuit 54 to obtain an arbitrary list of trusted end-user public keys, associated with specified entities by some means such as the public keys being contained in public key certificates. Having done this, the processing unit 50 then functions as a circuit 56 to determine whether the list was obtained in a manner consistent with a security policy of a secured community. At this point, the processing unit 50 then functions as a circuit 58 to add trusted end-user public key certificates contained in the arbitrary list to a trusted public key list. The functionality of circuits 54-58 will be discussed in greater detail with reference with FIGS. 3 through 5.

Figure 3:
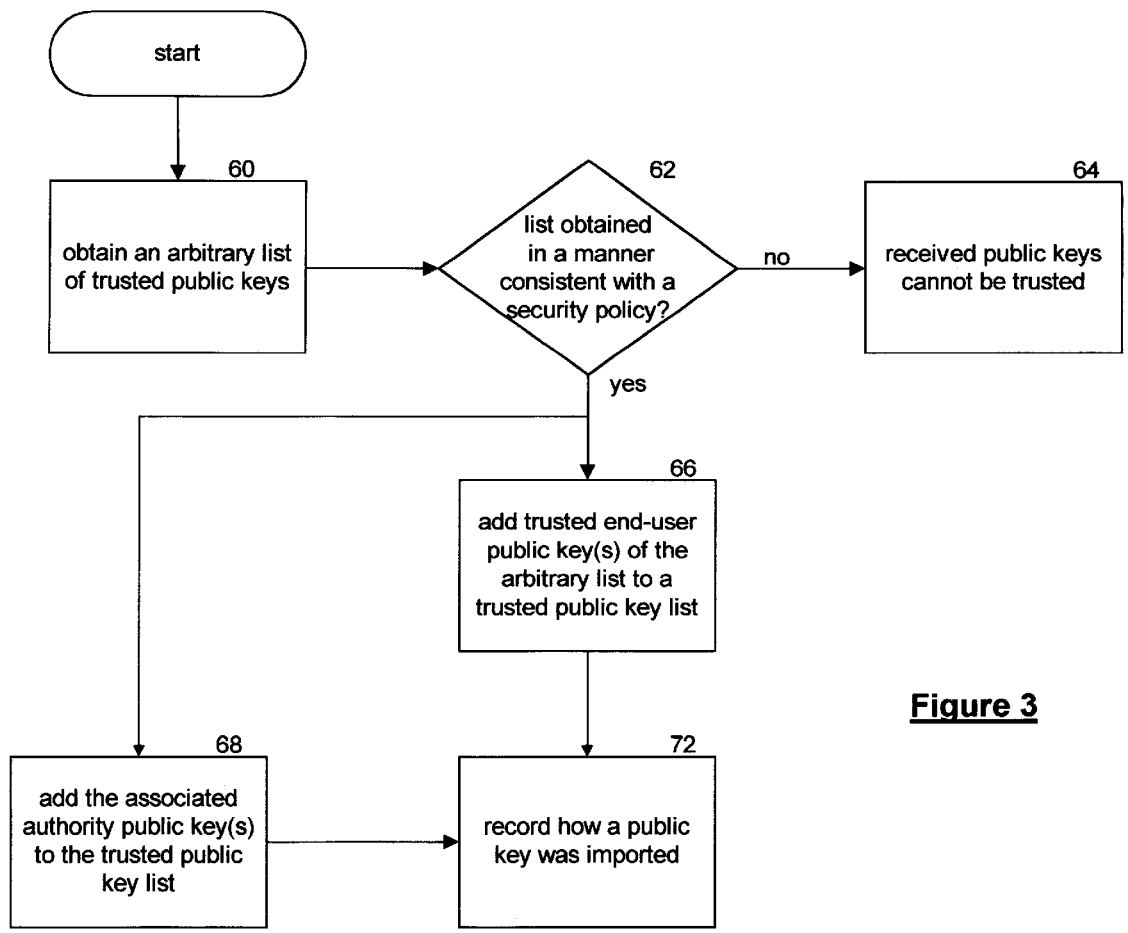
FIG. 3 illustrates a logic diagram of a method for creating communities of trust in accordance with the present invention.

FIG. 3 illustrates a logic diagram of a method for creating communities of trust within a secured communications system. The process begins at step 60 where an end-user obtains an arbitrary list of trusted end-user public key certificates. The arbitrary lists may be obtained from another end-user, wherein the arbitrary list includes at least one public key certificate of an end-user. The arbitrary list may also be received from an associated authority where the arbitrary list includes at least one public key certificate of an end-user. As such, an end-user may receive at least one other public key certificate of an end-user from another end-user or from an associated authority.

The process then proceeds to step 62 where a determination is made as to whether the list was obtained in a manner consistent with a security policy. The security policy may establish that an arbitrary list may be received by an end-user by importing the arbitrary list from another end-user (optionally limiting the set of end-users allowed to be the source of such lists); importing the arbitrary list from an associated authority (optionally limiting the set of associated authorities allowed to be the source of such lists); importing the public key certificate(s) of an end-user from another end-user; importing the public key certificate(s) of an associated authority from another end-user; importing the public key certificate(s) of an end-user from an associated authority; or importing the public key certificate(s) of an associated authority from an associated authority. As such, an end-user may have any of these features enabled or precluded. As mentioned previously, the use of certificates is a convenience, but what is imported and stored in the trusted list consists in essence of data allowing the public key to be associated with the owner entity of that key. At a minimum, the end-user will be enabled to receive the public key certificate(s) of an associated authority from its associated authority as per co-pending application entitled METHOD AND APPARATUS FOR PUBLIC KEY MANAGEMENT, having an attorney docket number of ENT970710-2, and assigned to the same assignee as the present patent application. Depending on the policy established for the secure communication system, each end-user might be individually granted the right to import trusted end-user or associated authority public key certificates from other specified or arbitrary end-users and/or from other specified or arbitrary associated authorities. More generally, the security policy with respect to importing trusted public keys is a set of well-defined rules which are enforced where the certificates are imported.

If the list was not obtained in a manner consistent with the security policy, the process proceeds to step 64. At step 64, the end-user public keys or certificates contained in the arbitrary list cannot be trusted. As such, the public keys in the arbitrary list are not added to the trusted list. If, however, the arbitrary list was obtained in a manner that is consistent with the security policy, the process proceeds to step 66. At step 66, the end-user trusted public keys contained in the arbitrary list are added to the trusted public key list.

The process then proceeds to step 68 where the end-user may further add to the trusted key list any acceptable associated authority public keys received. Depending on policy, the associated authority public key certificate may be obtained from another end-user or from an associated authority. Next, the process proceeds to step 72 where the end-user optionally records for future reference, an indication of how each key or certificate was imported. The record could indicate whether each end-user certificate was imported from another end-user and/or from an associated authority and could also indicate the specific source entity, or whether each associated authority public key certificate was imported from an end-user and/or an associated authority and could indicate the specific source entity.

Figure 4:
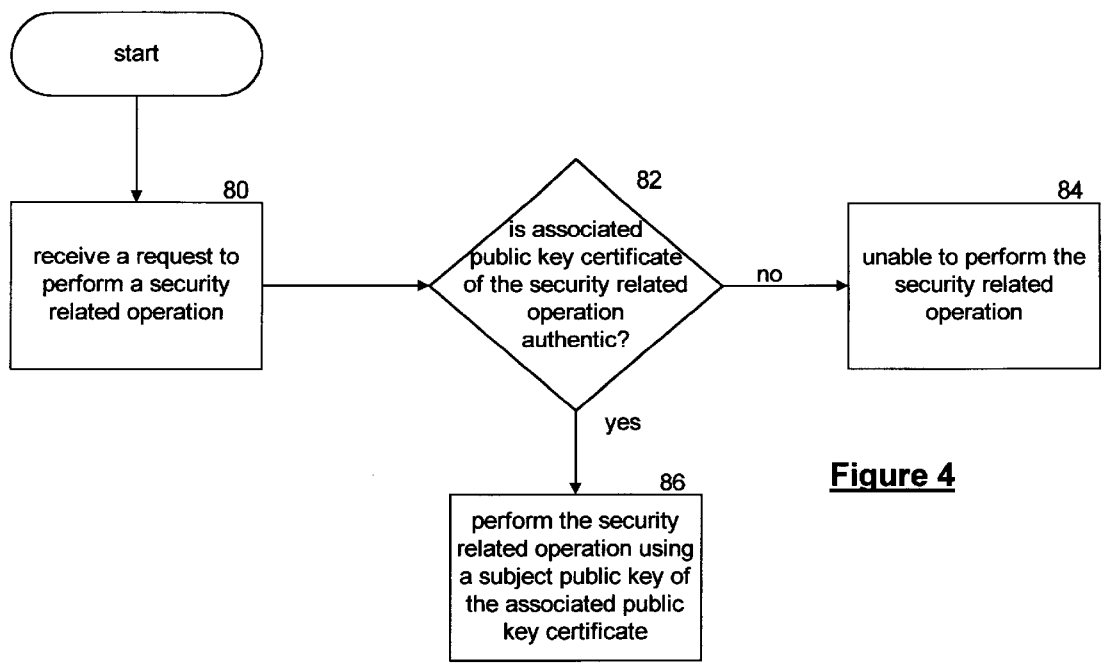
FIG. 4 illustrates a logic diagram of a method for processing a security-related operation in accordance with the present invention.

FIG. 4 illustrates a logic diagram of a method for processing a security related operation. The process begins at step 80 where the end-user receives a request to perform a security-related operation, which involves an associated public key certificate. The security-related operation could be requesting the end-user to retrieve a signature public key certificate to verify the public key within it, for example to verify the signature on an incoming message. Alternatively, the security related operation could be requesting the end-user to obtain an encryption public key certificate (i.e., the associated public key certificate) of a recipient end-user such that the requesting end-user may prepare an encrypted message for the recipient. The process then proceeds to step 82 where a determination is made as to whether the associated public key certificate of the security-related operation is authentic. As previously mentioned and as will be further discussed with reference to FIG. 5, a public key certificate is authenticated based on the signature of the certificate or based on additional checks made using the trusted public key list.

If the associated public key certificate of the security-related operation is not authenticated, the process proceeds to step 84. At step 84, the end-user is unable to perform the security-related operation using the associated public key certificate. If, however, the associated public key certificate is authenticated, the process proceeds to step 86. At step 86, the security related operation is performed using a subject public key of the associated public key certificate. Note that the subject public key was discussed with reference to certificate 42 of FIG. 1.

Figure 5:
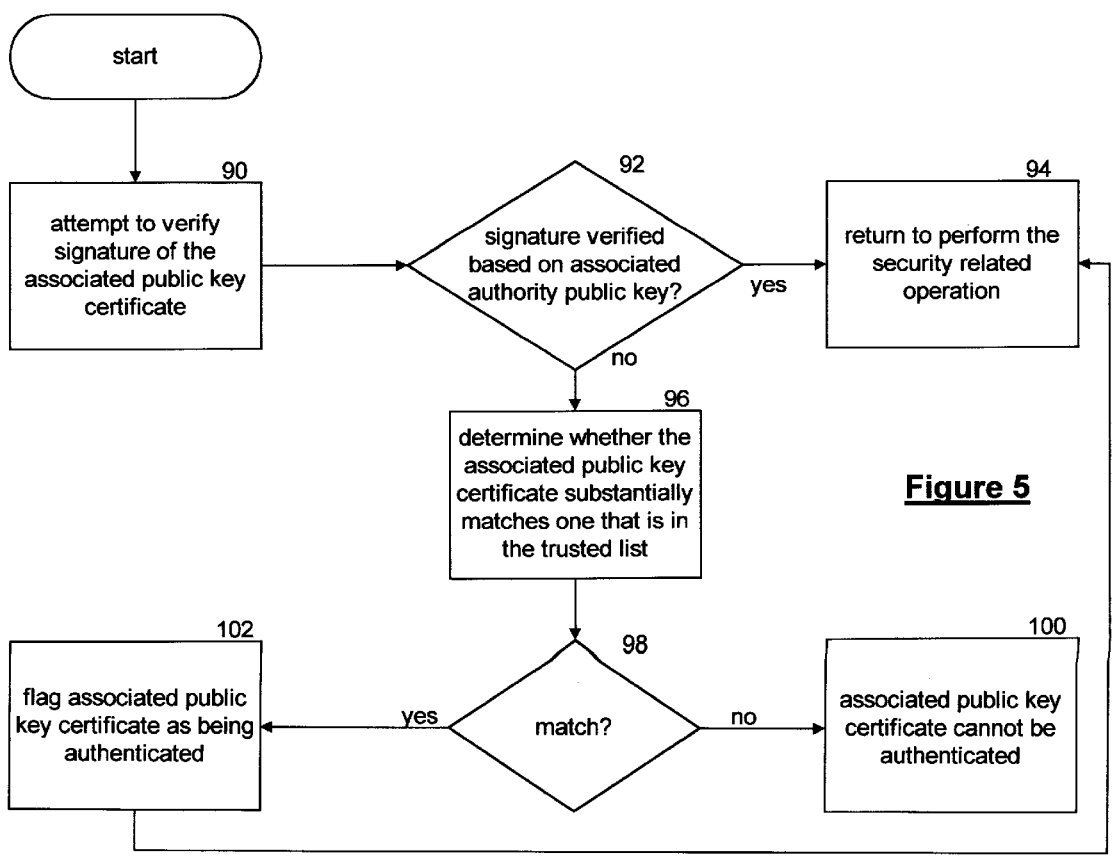
FIG. 5 illustrates a logic diagram of a method for verifying an associated public key certificate of a security-related operation in accordance with the present invention.

FIG. 5 illustrates a logic diagram of a method for verifying the associated public key certificate accompanying a security-related operation, for the case where this accompanying certificate is a signature verification public key certificate. The process begins at step 90 where an attempt is made to verify the signature of the associated public key certificate, which is done by attempting to verify the signature of the associated authority that signed the associated public key certificate. The process proceeds to step 92 where a determination is made as to whether this certificate was signed by an associated authority whose trusted public key is stored in the end-users trusted public key list. If so, this authority public key is used to verify the authenticity of the certificate per the customary signature verification technique. If the list does not include the public key certificate of the signing associated authority, nor the public key certificate of the signing authority at the root of an available certificate chain (as previously discussed) which leads to the associated public key certificate of the security related operation, then the signature cannot be verified per the usual method of certificate signature validation; it must be verified per a secondary method. As previously mentioned in the example of FIG. 1, when the public key certificate of end-user no. 7 was authenticated by end-user no. 1, end-user no. 1 required an alternate method because end-user no. 1 did not have the public key certificate of associated authority no. 3 (i.e., the authority that signed the public key certificate of end-user no. 7) in its trusted list.

If the signature is verified, the process proceeds to step 94 where the process returns to step 86 of FIG. 4 to perform the security related operation. If, however, the signature was not verified per the usual method, the process proceeds to step 96. At step 96, a determination is made as to whether the associated public key certificate substantially matches one that is stored in the trusted list. As previously mentioned in the example of FIG. 1, end-user no. 1 verified the public key certificate of end-user no. 7 by comparing it with the public key certificate of end-user no. 7 it had in its trusted list. In addition, when an end-user is encrypting an outgoing message, a match occurs when the trusted key, which can be identified with an intended recipient and which is stored as a key, key representation, or certificate, is in the list (as described further below). Further, if the trusted key is stored as a hashed representation of the public key or certificate, a match occurs when the stored hashed representation matches a newly calculated hashed representation. The newly calculated hashed representation may be derived from a public key certificate accompanying an incoming message or from a public key certificate obtained from a public directory or a local cache for an outgoing message.

If a match occurs at step 98, the process proceeds to step 102. At step 102, the process flags the associated public key certificate as being authenticated. As such, the security related operation may be performed. If, however, a match does not occur, the associated public key certificate cannot be authenticated, thus the security related operation cannot be performed in a trustworthy manner.

As an alternate example, if the security related operation at step 82 is encryption, the public key or certificate associated with the security related operation serves as an encryption public key, and the matching process described above is not used. Instead, a distinguishing name of the intended recipient is used to locate, from within the trusted key list, the corresponding encryption public key of this recipient. This trusted key is then directly flagged as authentic at step 102.

As a further enhancement, prior to flagging a public key certificate at step 102 as authenticated, additional checks may be included. For example, the certificate may be verified for compliance with a validity period, such that if the public key certificate is outdated (i.e., has a date that is outside of the validity period), it will not be authenticated, even though it is in the list. As another example, the authentication process may include checking a revocation list. If the certificate is on the trusted list and is also on the revocation list, indicating that it is no longer a valid public key certificate, it will not be authenticated.

The preceding discussion has presented a method and apparatus for creating communities of trust, i.e., the ability to individually trust other end-users in a manner consistent with a security policy. The communities of trust enable end-users to have trust in the public keys of other sets of end-users by acquiring public key certificate lists from other end-users and/or from associated authorities. In addition, an end-user may acquire trusted public key certificates of associated authorities from end-users and/or associated authorities. As such, the communities of trust to which individual end-users in a secure communications system belong can be defined with greater flexibility and convenience than by the all or nothing approach of only trusted public key certificates of associated authorities, or than by importing only single trusted certificates rather than lists of certificates.

What is claimed is:

1. A computing device comprising:
    a processing unit; and
    memory operably coupled to the processing unit, wherein the memory stores programming instructions that, when read by the processing unit, causes the processing unit to: (a) obtain an arbitrary list of trusted public key certificates; (b) determine whether the arbitrary list of the trusted public key certificates was obtained in a manner consistent with a security policy of a secure community; and (c) add trusted public key certificates of the arbitrary list to a trusted public key list when the arbitrary list of trusted public key certificates was obtained in a manner consistent with a security policy.

2. The computing device of claim 1 further comprises, within the memory, programming instructions that, when read by the processing unit, causes the processing unit to: obtain the arbitrary list which includes at least one public key certificate of at least one of an associated authority and an end-user.

3. The computing device of claim 2 further comprises, within the memory, programming instructions that, when read by the processing unit, causes the processing unit to obtain the public key certificate from another end-user.

4. The computing device of claim 2 further comprises, within the memory, programming instructions that, when read by the processing unit, causes the processing unit to obtain the public key certificate from an associated authority.

5. The computing device of claim 2 further comprises, within the memory, programming instructions that, when read by the processing unit, causes the processing unit to maintain a record indicating whether a certificate contained in the trusted public key list was obtained by importing an end-user certificate from the another end-user, importing the end-user certificate from an associated authority, importing an associated authority public key certificate from the another end-user, or importing the associated authority public key certificate from the associated authority.

6. The computing device of claim 1 further comprises, within the memory, programming instructions that, when read by the processing unit, causes the processing unit to:
    receive a request to perform a security related operation;
    determine whether an associated public key certificate of the security related operation is verified as authentic; and
    perform the security related operation using a subject public key of the associated public key certificate when the associated public key certificate is authentic.

7. The computing device of claim 6 further comprises, within the memory, programming instructions that, when read by the processing unit, causes the processing unit to:
    determine whether the associated public key certificate substantially matches a public key certificate stored in the trusted public key list;
    flag the associated public key certificate as being verified when the associated public key certificate substantially matches a public key certificate stored in the trusted public key list.

8. The computing device of claim 6 further comprises, within the memory, programming instructions that, when read by the processing unit, causes the processing unit to determine that the manner of obtaining is consistent with the security policy when the arbitrary list is received via at least one of: importing the arbitrary list from another end-user, importing the arbitrary list from an associated authority, importing a certificate of an end-user from another end-user, importing a certificate of an associated authority from the another end-user, importing the certificate of the associated authority from the associated authority, and importing the certificate of the end-user from the associated authority.

9. A digital storage medium that stores programming instructions that, when read by a processing unit, causes the processing unit to create communities of trust, the digital storage medium comprises:
    first means for storing programming instructions that, when read by the processing unit, causes the processing unit to obtain an arbitrary list of trusted public key certificates;
    second means for storing programming instructions that, when read by the processing unit, causes the processing unit to determine whether the arbitrary list of the trusted public key certificates was obtained in a manner consistent with a security policy of a secure community; and
    third means for storing programming instructions that, when read by the processing unit, causes the processing unit to add trusted public key certificates of the arbitrary list to a trusted public key list when the arbitrary list of trusted public key certificates was obtained in a manner consistent with a security policy.

10. The digital storage medium of claim 9 further comprises means for storing programming instructions that, when read by the processing unit, causes the processing unit to:

obtain the arbitrary list which includes at least one public key certificate of at least one of an associated authority and an end-user.

11. The digital storage medium of claim 10 further comprises means for storing programming instructions that, when read by the processing unit, causes the processing unit to obtain the at least one public key certificate from another end-user.

12. The digital storage medium of claim 10 further comprises means for storing programming instructions that, when read by the processing unit, causes the processing unit to obtain the at least one public key certificate from an associated authority.

13. The digital storage medium of claim 10 further comprises means for storing programming instructions that, when read by the processing unit, causes the processing unit to provide feedback as to maintain a record indicating whether a certificate contained in the trusted public key list was obtained by importing an end-user certificate from the another end-user, importing the end-user certificate from an associated authority, importing an associated authority public key certificate from the another end-user, or importing the associated authority public key certificate from the associated authority.

14. The digital storage medium of claim 9 further comprises means for storing programming instructions that, when read by the processing unit, causes the processing unit to:

receive a request to perform a security related operation;

determine whether an associated public key certificate of the security related operation is verified as authentic; and perform the security related operation using a subject public key of the associated public key certificate when the associated public key certificate is authentic.

15. The digital storage medium of claim 14 further comprises programming instructions that, when read by the processing unit, causes the processing unit to:

determine whether the associated public key certificate substantially matches a public key certificate stored in the trusted public key list;

flag the associated public key certificate as being verified when the associated public key certificate substantially matches a public key certificate stored in the trusted public key list.

16. The digital storage medium of claim 9 further comprises programming instructions that, when read by the processing unit, causes the processing unit to determine that the manner of obtaining is consistent with the security policy when the arbitrary list is received via at least one of: importing the arbitrary list from another end-user, importing the arbitrary list from an associated authority, importing a certificate of an end-user from another end-user, importing a certificate of an associated authority from the another end-user, importing the certificate of the associated authority from the associated authority and importing the certificate of the end-user from the associated authority.

* * * * *